(12) United States Patent
Meier

(10) Patent No.: US 6,626,350 B2
(45) Date of Patent: Sep. 30, 2003

(54) METHOD OF REPAIRING METALLIC COMPONENTS

(75) Inventor: Reinhold Meier, Dorfen (DE)

(73) Assignee: MTU Aero Engines GmbH, Munich (DE)

( * ) Notice: Subject to any disclaimer, the term of this patent is extended or adjusted under 35 U.S.C. 154(b) by 0 days.

(21) Appl. No.: 09/887,544

(22) Filed: Jun. 25, 2001

(65) Prior Publication Data

US 2002/0020734 A1 Feb. 21, 2002

(30) Foreign Application Priority Data

Jun. 23, 2000 (DE) .......................... 100 30 776

(51) Int. Cl.$^7$ .............................. B23K 31/02; B23K 1/20
(52) U.S. Cl. ..................... 228/119; 228/118; 29/402.08; 29/402.09
(58) Field of Search ................... 228/119, 118, 228/165, 225, 226, 231, 244–246; 29/402.08, 402.09

(56) References Cited

U.S. PATENT DOCUMENTS

| | | | |
|---|---|---|---|
| 4,008,844 A | | 2/1977 | Duvall et al. |
| 4,121,894 A | * | 10/1978 | Cretella et al. .......... 416/213 R |
| 4,710,103 A | * | 12/1987 | Faber et al. ................ 228/208 |
| 4,726,104 A | * | 2/1988 | Foster et al. ................ 228/118 |
| 4,878,953 A | * | 11/1989 | Saltzman et al. ........... 148/512 |
| 4,982,066 A | * | 1/1991 | Waring ................ 219/137 PS |
| 5,048,183 A | * | 9/1991 | Cang et al. ................. 228/119 |
| 5,522,134 A | * | 6/1996 | Rowe et al. .............. 29/402.08 |
| 5,762,727 A | * | 6/1998 | Crawmer et al. ........... 148/524 |
| 5,794,338 A | * | 8/1998 | Bowden et al. .......... 29/402.09 |
| 5,873,703 A | * | 2/1999 | Kelly et al. .................. 228/119 |
| 6,332,272 B1 | * | 12/2001 | Sinnott et al. ........... 29/402.08 |
| 6,338,765 B1 | * | 1/2002 | Statnikov ................ 116/137 A |
| 6,376,801 B1 | * | 4/2002 | Farrell et al. .......... 219/124.34 |
| 6,543,134 B2 | * | 4/2003 | Meier ........................ 29/889.1 |

FOREIGN PATENT DOCUMENTS

| | | |
|---|---|---|
| DE | 2600237 | 2/1977 |
| DE | 130853 | 5/1978 |

OTHER PUBLICATIONS

Robert Killing, "Auftragschweiben als Mittel zum Aufbringen Widerstandsfahiger Oberflachen" Maschinenmarket, 1982.

D. Von H. Behnisch, "Thermisches Spritzen zur Werterhaltung und Instandsetzung von Bauteilen" 1979.

* cited by examiner

*Primary Examiner*—M. Alexandra Elve
*Assistant Examiner*—L. Edmondson
(74) *Attorney, Agent, or Firm*—Crowell & Moring LLP

(57) ABSTRACT

A method is available for repairing metallic components such as gas turbines, which have mechanically weight-carrying grooves, where the longitudinal edges of the grooves which exist on the component surface are largely in a plane and their actual contour deviates, at least locally, due to removal and/or displacement the component material from the desired contour. The method begins with abrasive blasting of the groove surfaces, followed by closing of the open groove ends by build-up welding, and subsequent filling of the grooves with soldering powder. The soldering powder is heated to liquefaction, then cooled and solidified in a vacuum, and the desired contour of the groove is then machined.

19 Claims, 1 Drawing Sheet

METHOD OF REPAIRING METALLIC COMPONENTS

BACKGROUND OF THE INVENTION

This application claims the priority of German Patent Document 100 30 776.0, filed Jun. 23, 2000, the disclosure of which is expressly incorporated by reference herein.

The invention relates to a method of repairing metallic components, particularly for gas turbines, having mechanically weight-carrying grooves, whose longitudinal edges existing on the component surface are situated at least largely in a plane, and whose actual contour deviates at least locally after the removal and/or displacement of the component material from the desired contour, by the application of an at least predominantly metallic additional material to the actual groove contour as well as by the removing machining to the desired contour, for each groove.

As a rule, weight-carrying grooves in metallic components interact form-lockingly with other components engaging in the grooves. The pairings are usually not free of play and permit relative movements. For this reason, damage may occur after a certain operating period as a result of plastic deformation, frictional corrosion, frictional wear, cracks, chipping-off, etc. which, as a rule, are connected with an at least local widening of the groove cross-section beyond the desired contour. At high component temperatures, as they occur particularly in gas turbines, the mechanical characteristics of metallic materials are considerably impaired so that such damages occur faster and in an intensified form. In order to prevent an exchange of the entire respective component, it is endeavored to repair the groove or grooves in a targeted manner. Different methods are being used or tested for this purpose whose common characteristics consist of that fact that the material is applied in layers to the damaged and therefore no longer dimensionally accurate surfaces of the groove with a certain overdimension and is subsequently partially removed to the dimension during the machining. The used coating methods are metal spraying, galvanic coating or buildup welding. Since, as a rule, the lateral surfaces of the groove are damaged which are situated opposite one another at a narrow distance and virtually "shade" one another, it is difficult to impossible to achieve a sufficient uniform coat of material in this case.

In view of the above, it is an object of the invention to provide a method of repairing metallic components with damaged or no longer dimensionally accurate grooves, which permits the restoration of the desired condition in a relatively simple, fast and reliable manner, specifically with respect to the characteristics of the material and the geometry, including the surface quality. A limitation exists in that, in the case of each of the grooves, the longitudinal edges on the surface side of the component should at least largely be situated in a plane. In other words, the direct groove edges formed by the component surface should, if possible, be at one level, in which case the groove bottom will usually also be even and parallel to this level.

The above-mentioned object is achieved by providing a method of repairing metallic components, particularly for gas turbines, having mechanically weight-carrying grooves, whose longitudinal edges existing on the component surface are situated at least largely in a plane, and whose actual contour deviates at least locally after the removal and/or displacement of the component material from the desired contour, by the application of an at least predominantly metallic additional material to the actual groove contour as well as by the removing machining to the desired contour, for each groove, said method comprising the following sequential steps: mechanical abrasive blasting of the groove surfaces by means of a non-oxidic abrasive, closing of open groove ends by a buildup welding of a welding material with the same base as the component material, filling the groove closed on the end side with a soldering powder which has the same base as the material of the component but melts at a lower temperature, without or with a wear-reducing and/or filling additional material, the empty-volume fraction of the soldering powder without or with the additional material being compensated by its accumulation beyond the groove surface, heating the soldering powder in the vacuum to the liquefaction and metallic joining with the component material, the groove being held in a horizontal position opened toward the top, as well as cooling and solidifying in the vacuum, and machining to the desired contour by an extensive removal of the solidified solder. According to the invention, the groove surfaces are first cleaned with a non-oxidic abrasive and activated. Then, if required, the groove is closed at the end by welding, so that virtually a casting mold is obtained which is open toward the top. Next, the groove is filled with a high-temperature solder in powder form which is very similar to the material of the component or partially is identical with it, and is overcharged beyond the groove cross-section. The protruding powder volume should correspond to the empty-volume fraction of the entire powder quantity per groove. After the subsequent heating and liquefying of the solder in the vacuum, the groove is filled to the edge with dense liquid metal, in which case, if required, non-molten metallic or ceramic particles or metal bodies may be contained as an addition. After the metallurgical joining of the solder and the component as well as the cooling and complete solidification in the vacuum, the groove is finished to the desired dimension, a large portion of the solder and of the end-side welding material being removed again. The removed material can be recycled and will therefore not be lost.

Preferred embodiments of the method are described herein and in the claims.

Other objects, advantages and novel features of the present invention will become apparent from the following detailed description of the invention when considered in conjunction with the accompanying drawings.

DETAILED DESCRIPTION OF THE DRAWINGS

Figure 1:
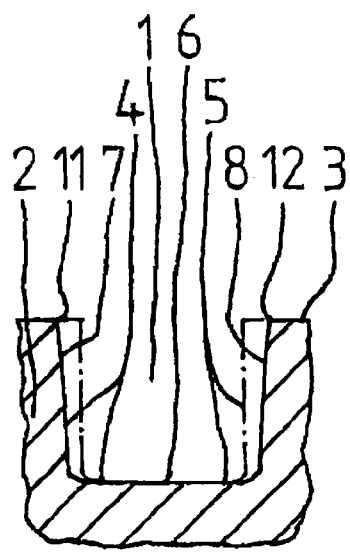
FIG. 1 is a simplified representation, which is not true to scale, of a cross-section of a groove with worn-down lateral walls.

The groove 1, which is open at the surface 3 of a component 2, has worn-down lateral surfaces 7, 8, whereas the groove bottom 6 is still in a good condition and in the desired position. The desired contour 5 of the groove 1 is illustrated in FIG. 1 by means of a dash-dotted line; at the groove bottom 6, it corresponds to the actual contour 4. The lateral surfaces 7, 8 end at the component surface 3 in longitudinal edges 11, 12. The groove 1 may be straight and/or curved in the longitudinal direction, in which case it is important for the applicability of the invention that the longitudinal edges 11, 12 or 13, 14 existing at the component surface are situated at least in a good approximation in a plane. As a rule, the groove bottom 6 will also be even and parallel to the above-mentioned plane. Thus, primarily even grooves are involved in a straight or curved construction, in which case, the groove can also be closed in itself in a ring shape. One example would be a groove which is produced by plunge turning on the face of a rotating component. For reasons of simplicity, the present figures show a straight groove 1. The groove 1 according to FIG. 1, which has been widened by wear, is cleaned in a first working step by means of a non-oxidic abrasive, such as silicon carbide, and is activated so that its surfaces 6, 7, 8 are present in a slightly roughened, metallically clean condition without any oxide layers in order to form an optimally adhering base for a metallic coating. This is familiar to a person skilled in the art and is not illustrated in detail.

Figure 2:
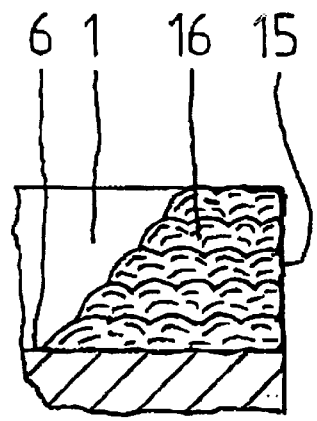
FIG. 2 is a simplified partial sectional view, which is not true to scale, of the groove in the area of a groove end.

FIG. 2 is a partial longitudinal sectional view of the above-mentioned groove 1. The groove end 15, which is open at first, is already closed here by a local weld buildup 16 which fills the entire groove end cross-section. The welding material has at least the same base as the material of the component, for example, a Ti base, an Fe base or an Ni base (titanium, iron or nickel base), or is preferably identical. If the groove 1 still has another open end, this end is closed in the same manner.

Figure 3:
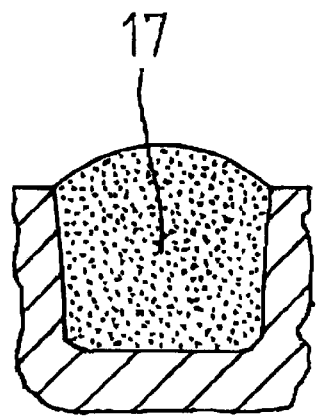
FIG. 3 is a simplified view, which is not true to scale, of a cross-section according to FIG. 1, of the grooved filled beyond its surface with soldering powder.

FIG. 3 again is a cross-sectional view of the groove 1, the groove 1 being filled with soldering powder 17 beyond its upper edge. With respect to its alloy composition, the soldering powder 17 largely corresponds to the material of the component; however, its melting point is lowered by at least one additional element, such as boron or silicon. In this manner, the solder can be liquified without melting-on the material of the component. The soldering powder 17 can be mixed, for example, by one half from the alloy powder identical with the material of the component and, by the other half, from melting-point-reduced alloy powder with a B-addition or an Si-addition. Furthermore, wear-reducing particles, that is, particles which are harder or more resistant to abrasion in relation to the material of the component, of a metallic or ceramic type and/or filling metal bodies, can be admixed for reducing the amount of soldering powder. It should be taken into account that the soldering powder 17 contains a certain empty-volume fraction. By "overcharging" the groove 1, the soldering powder volume—including the additional material—is dimensioned such that it corresponds to the groove volume plus the empty-volume fraction of the soldering powder 17. In other words, the solder net volume—without the empty-volume fraction—should correspond to the groove volume. Possibly existing additional material is not illustrated in the figure.

Figure 4:
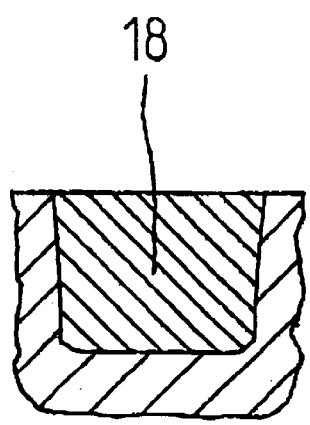
FIG. 4 is a simplified view, which is not true to scale, of a cross-section according to FIG. 3 after the melting and solidifying of the solder.

FIG. 4 is a cross-sectional view of the condition after the melting-on and solidifying of the solder 18. The groove is completely filled with massive material which is metallurgically joined with the material of the component. Since the solder 18 is at first present in a liquid form, it is easily understandable that the groove 1 must be closed at the end side and must have longitudinal upper edges which are situated in a plane which can be horizontally positioned. Otherwise, the groove could not be completely filled with liquid; at least a portion of the liquified solder would flow out. Starting from the condition according to FIG. 4, with the solidified solder 18, as an additional process step, an annealing treatment can be carried out in a vacuum or in an oxygen-reducing atmosphere, for example, in hydrogen fluoride. The object in this case is the removal of the melting-point-lowering boron or silicon by diffusion into the component material from the groove wall area in order to avoid disadvantageous embrittlement effects. This advantageous process step also does not have to be shown in detail.

Figure 5:
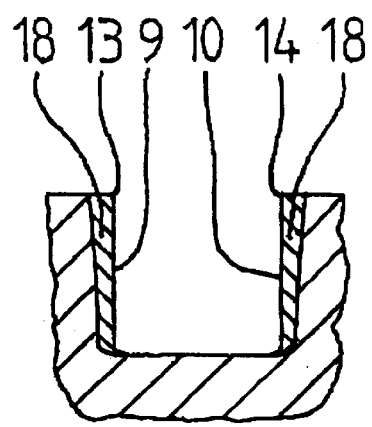
FIG. 5 is a simplified view, which is not true to scale, of a cross-section according to FIG. 4 after the finishing of the groove to the desired contour.

FIG. 5 finally is a cross-sectional view of the condition of the groove 1 which was finished to the desired contour, that is, is repaired. It is shown that a large portion of the solder 18 was removed, for example, by means of trimming, broaching, milling, turning and/or grinding. The lateral surfaces 9, 10 formed by the solder 18 correspond to the desired contour 5 in FIG. 1; in the area of the still intact groove bottom 6, the solder 18 was completely removed. In the event of a local deficit of material in this area, solder can naturally also remain here. The lateral solder layers extend to the component surface 3 and contain the upper longitudinal edges 13, 14 of the groove 1. As a result of the above-mentioned annealing treatment with the removal of the melting-point-reducing elements by diffusion, the solder layers are also adapted in the best possible manner with respect to their heat stability to the material of the component; that is, they have virtually lost their solder characteristic and are largely identical with the material of the component.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Method of repairing metallic components, particularly for gas turbines, having mechanically weight-carrying grooves, whose longitudinal edges existing on the component surface are situated at least largely in a plane, and whose actual contour deviates at least locally after the removal and/or displacement of the component material from the desired contour, by the application of an at least predominantly metallic additional material to the actual groove contour as well as by machining to the desired contour, for each groove, said method comprising the following sequential steps:

mechanical abrasive blasting of the groove surfaces by means of a non-oxidic abrasive, closing of open groove ends by a buildup welding of a welding material with the same base as the component material, filling the groove closed on the end side with a soldering powder which has the same base as the material of the component but melts at a lower temperature, without or with at least one of a wear-reducing material or filling additional material, the empty-volume fraction of the soldering powder without or with the additional material being compensated by its accumulation beyond the groove surface, heating the soldering powder in the vacuum to the liquefaction and metallic joining with the component material, the groove being held in a horizontal position opened toward the top, as well as cooling and solidifying in the vacuum, and machining to the desired contour by an extensive removal of the solidified solder.

2. Method according to claim 1, wherein silicon carbide is used as the abrasive, and wherein after the abrasive blasting, as desired, an annealing is carried out in an oxygen reducing atmosphere.

3. Method according to claim 1, wherein the soldering powder—with the exception of a possible additional material—is largely identical with the material of the component and contains boron or silicon as a melting-point-lowering element, in which case maximally approximately half of the soldering powder can consist of pure component material powder without any melting-point-lowering elements.

4. Method according to claim 2, wherein the soldering powder—with the exception of a possible additional material—is largely identical with the material of the component and contains boron or silicon as a melting-point-lowering element, in which case maximally approximately half of the soldering powder can consist of pure component material powder without any melting-point-lowering elements.

5. Method according to claim 1, wherein at least one of wear-reducing metallic particles, wear-reducing ceramic particles, or filling metal bodies, which have the same base as the component material, are added to the soldering powder as additional material.

6. Method according to claim 2, wherein at least one of wear-reducing metallic particles, wear-reducing ceramic particles, or filling metal bodies, which have the same base as the component material, are added to the soldering powder as additional material.

7. Method according to claim 3, wherein at least one of wear-reducing metallic particles, wear-reducing ceramic particles, or filling metal bodies, which have the same base as the component material, are added to the soldering powder as additional material.

8. Method according to claim 1, wherein an annealing treatment in a vacuum takes place after the liquification and the solidification of the solder in the groove.

9. Method according to claim 2, wherein an annealing treatment in a vacuum takes place after the liquification and the solidification of the solder in the groove.

10. Method according to claim 3, wherein an annealing treatment in a vacuum takes place after the liquification and the solidification of the solder in the groove.

11. Method according to claim 5, wherein an annealing treatment in a vacuum takes place after the liquification and the solidification of the solder in the groove.

12. Method according to claim 1, wherein the machining to the desired contour takes place in a cutting manner.

13. Method according to claim 2, wherein the machining to the desired contour takes place in a cutting manner.

14. Method according to claim 3, wherein the machining to the desired contour takes place in a cutting manner.

15. Method according to claim 5, wherein the machining to the desired contour takes place in a cutting manner.

16. Method according to claim 8, wherein the machining to the desired contour takes place in a cutting manner.

17. Method according to claim 2, wherein said oxygen reducing atmosphere is hydrogen fluoride.

18. Method according to claim 5, wherein said filling metal bodies are balls or wires.

19. Method according to claim 12, wherein said cutting manner is at least one method selected from the group consisting of broaching, trimming, turning, milling, and grinding.

* * * * *